(12) United States Patent
Miller

(10) Patent No.: US 7,379,592 B2
(45) Date of Patent: May 27, 2008

(54) SYSTEM AND METHOD FOR SIGNIFICANT DUST DETECTION AND ENHANCEMENT OF DUST IMAGES OVER LAND AND OCEAN

(75) Inventor: Steven D. Miller, Salinas, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 657 days.

(21) Appl. No.: 10/885,526

(22) Filed: Jun. 30, 2004

(65) Prior Publication Data

US 2005/0012035 A1  Jan. 20, 2005

Related U.S. Application Data

(63) Continuation-in-part of application No. 10/713,908, filed on Jan. 21, 2003, now Pat. No. 7,242,803.

(51) Int. Cl.
*G06K 9/34* (2006.01)
*G06K 9/00* (2006.01)
*G06K 9/40* (2006.01)
*G01J 3/50* (2006.01)
*H01J 5/16* (2006.01)
*H01J 40/14* (2006.01)
*G01V 5/00* (2006.01)
*G01V 5/04* (2006.01)

(52) U.S. Cl. .................... 382/173; 382/162; 382/275; 382/254; 250/265; 250/226

(58) Field of Classification Search ........ 382/173–180, 382/162–167, 254, 275; 250/265, 226
See application file for complete search history.

(56) References Cited

U.S. PATENT DOCUMENTS 5,612,901 A * 3/1997 Gallegos et al. ............... 702/3
6,542,831 B1 * 4/2003 Moosmuller et al. ......... 702/40
6,567,537 B1 * 5/2003 Anderson .................... 382/110
6,920,233 B2 * 7/2005 Wolfson et al. ............. 382/100

OTHER PUBLICATIONS

S.D. Miller, J.D. Hawkins, T.F. Lee, F.J. Turk, K. Richardson, A.P. Kuciaskas, J. Kent, R. Wade, C.E. Skupniewicz, J. Cornelius, J. O'Neal, P. Haggerty, K. Sprietzer, G. Legg, J. Henegar, and B. Seaton, "MODIS Provides a Satellite Focus on Operation Iraqi Freedom", International Journal of Remote Sensing, Apr. 10, 2005, pp. 1285-1296, vol. 27, No. 7.
S.D. Miller, "Satellite Surveillance of Desert Dust Storms", NRL Review Featured Research 2003, pp. 69-77.
S.D. Miller, "A Consolidated Technique for Enhancing Desert Dust Storms with MODIS", Geophysical Research Letters, Oct. 30, 2003, pp. 12-1-12-4, vol. 30, No. 20.

* cited by examiner

*Primary Examiner*—Matthew C. Bella
*Assistant Examiner*—Wesley Tucker
(74) *Attorney, Agent, or Firm*—John J. Karasek; Suresh Koshy

(57) ABSTRACT

A new processing capability for dust enhancement over land or water using image data from the Sea-viewing Wide Field of View Sensor (SeaWiFS) has been developed for Naval meteorology/oceanography (MetOc) operations support. The data are captured via direct broadcast high-resolution picture transmission (HRPT) at Navy Regional Centers in Rota, Bahrain, and Yokosuka, and processed at the Naval Research Laboratory in Monterey. The raw data are calibrated, corrected for missing lines and clutter, corrected for molecular scatter contamination, and enhanced through multispectral combination to yield value added products. The processing has been automated completely such that products, generated upon receipt of data, are hosted upon a password protected website typically 60 to 90 minutes from time of initial capture. This invention summarizes the Sea-WiFS instrument capabilities, the protocol followed for automated near real-time processing, a physical basis for the NRL enhancements, and specific examples of the products with extension to over-land dust enhancement as enabled by MODIS. It closes with a glimpse of the potential utility of these products from the perspective of the warfighter.

2 Claims, 14 Drawing Sheets

Cartoon illustration of preferential absorption of blue light by mineral dust, resulting in yellow reflected light.
Clouds scatter more uniformly over the visible wavelengths, resulting in white light

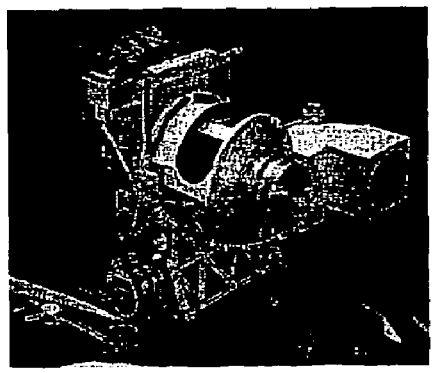
Fig-1 -- The SeaWiFS sensor (left) flying aboard the SeaStar platform (right)

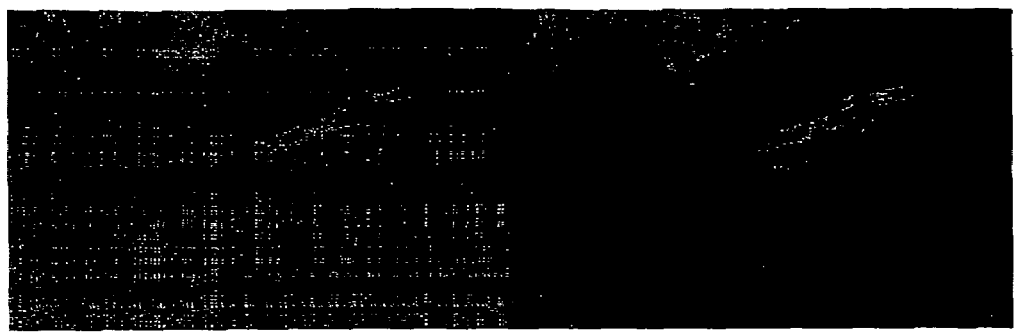
Fig-2 – Raw SeaWiFS data from a Navy Regional Center (NRC) receiving station (left) and the noise/line corrected equivalent (right)

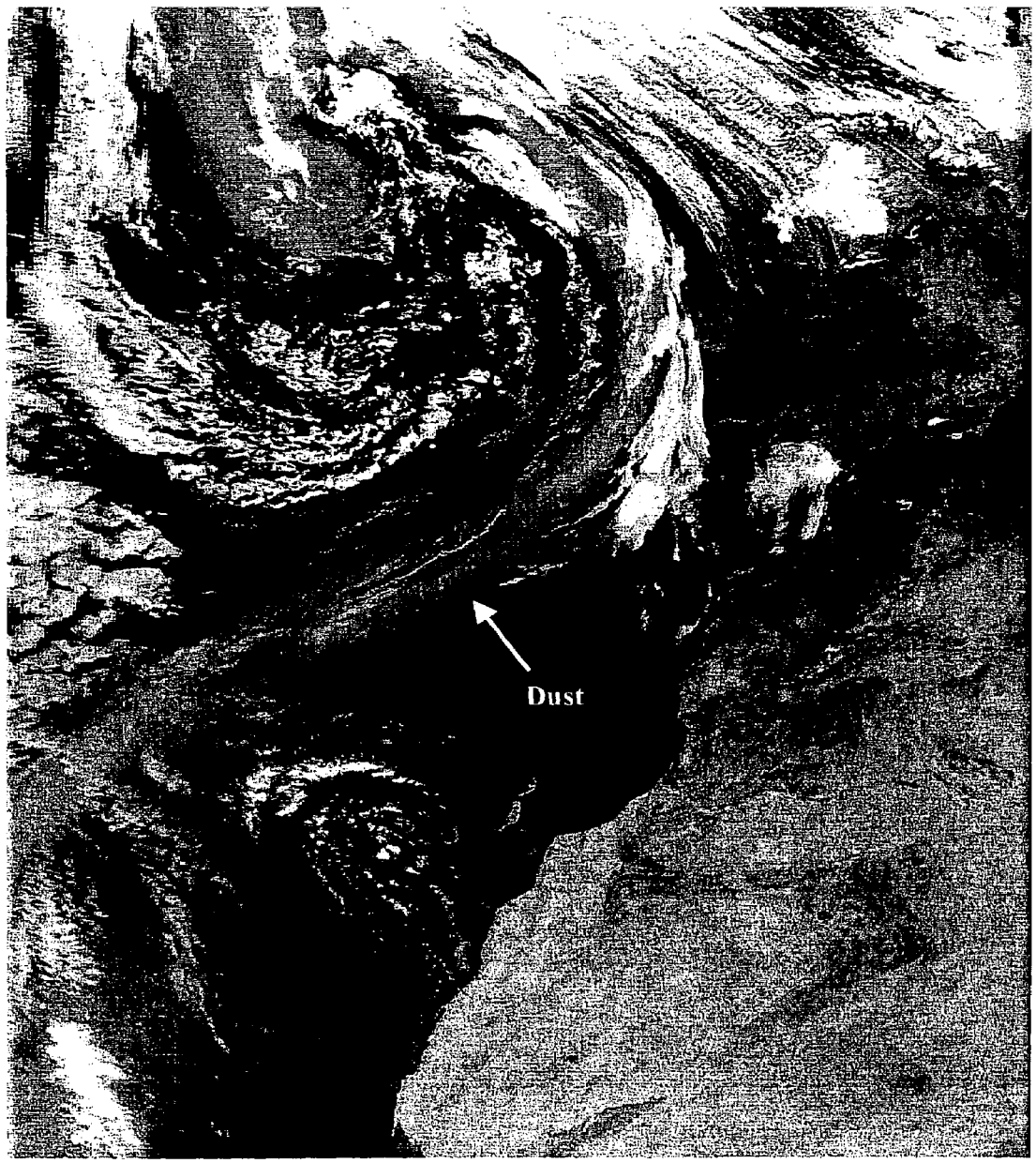
Fig-3 -- SeaWiFS High Resolution Picture Transmission (HRPT) true color image of the Eastern Atlantic Ocean, Iberian Peninsula, and Northwestern Africa, captured by NRC in Rota, Spain (02/13/01, 1255Z). A large dust plume wrapping into a baroclinic system is indicated

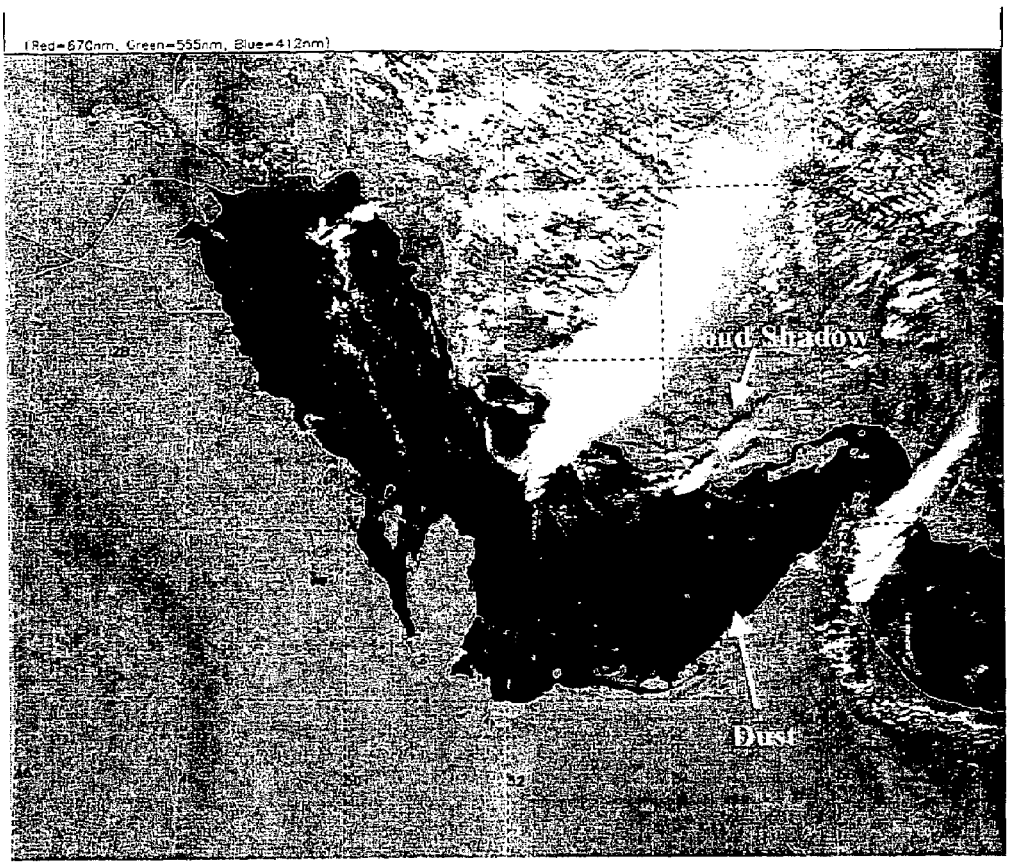
Fig-4 -- SeaWiFS HRPT true color image of the Persian Gulf area, captured by NRC in Bahrain. Airborne dust is indicated. Phytoplankton is responsible for the green pigmentation in the littoral regions

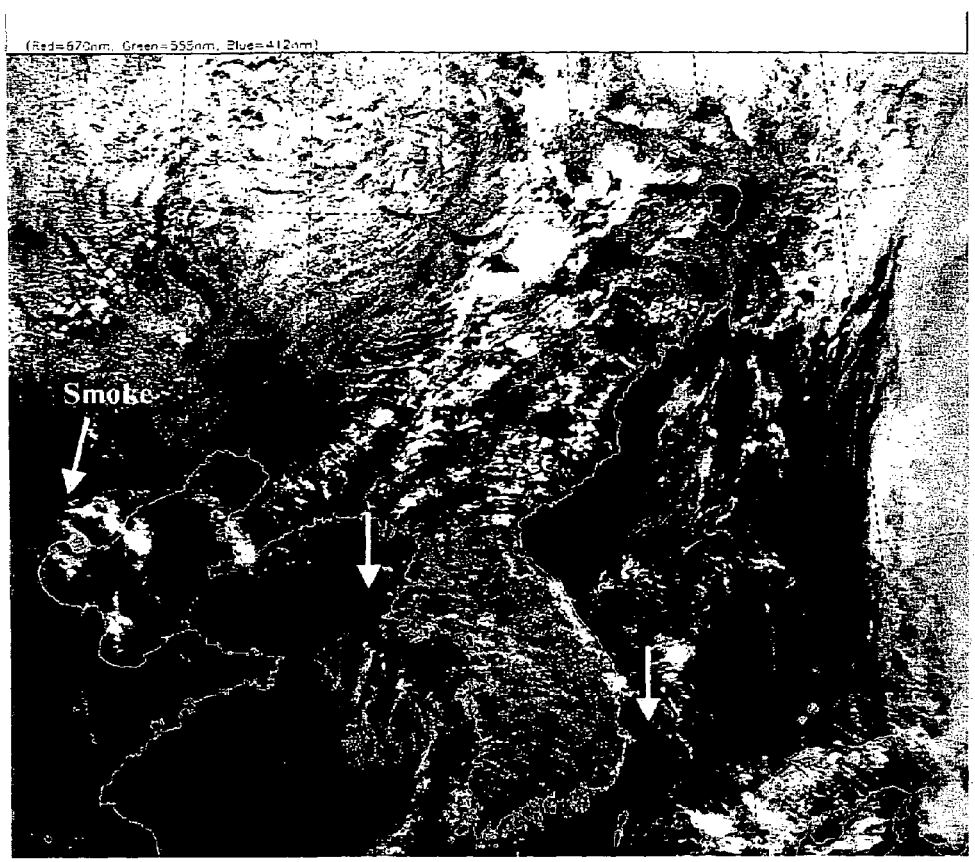
Fig-5 -- SeaWiFS HRPT true color image of the Korean Peninsula, captured by NRC in Yokosuka Japan. Yellow arrows indicate areas of biomass smoke/pollution

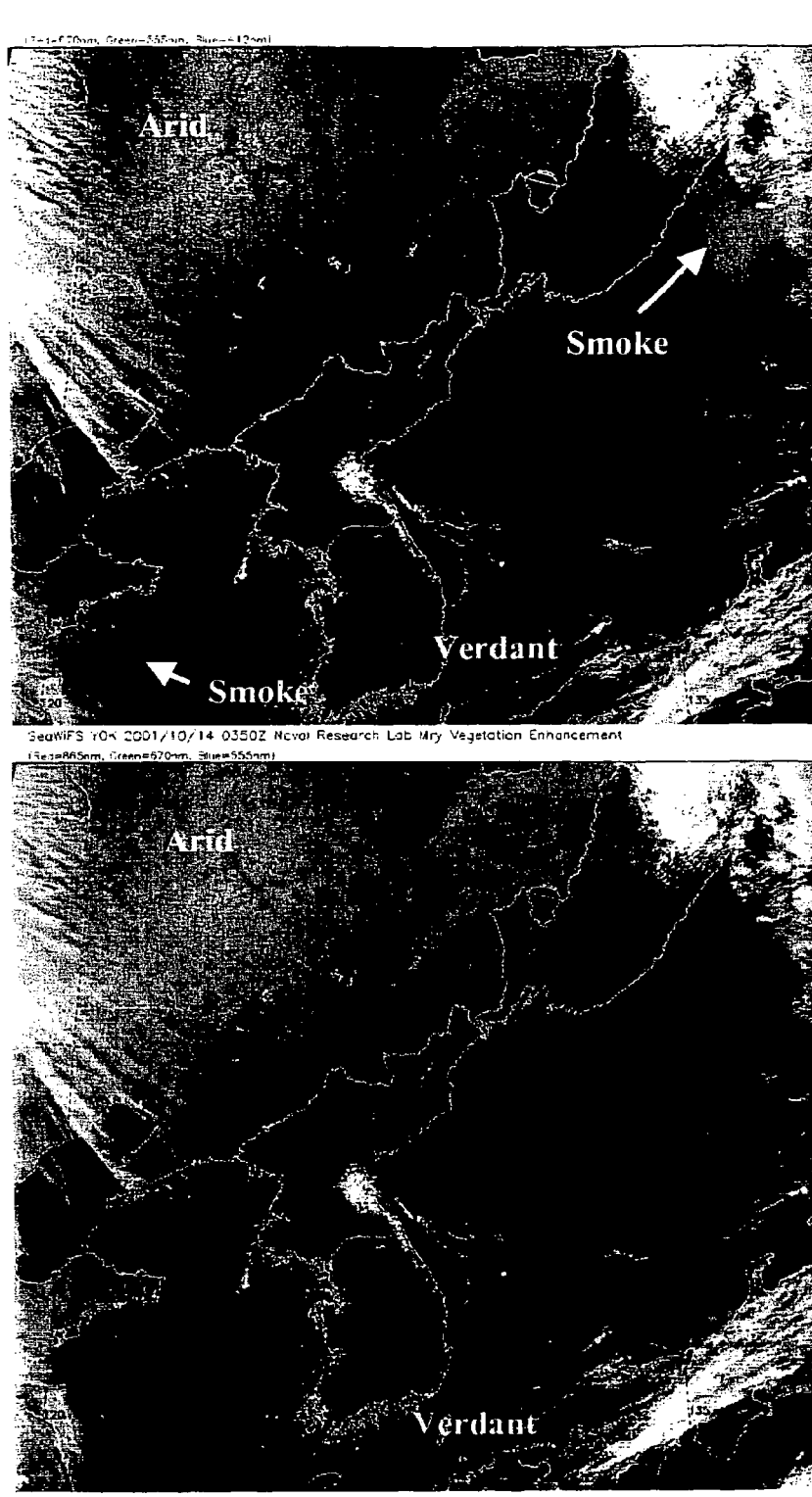
Fig-6 — True color (top) and vegetation enhancement (bottom). Bright red indicates regions with abundant plant life. Note seasonal changes in Fall vegetation compared against Summer (Figure 5)

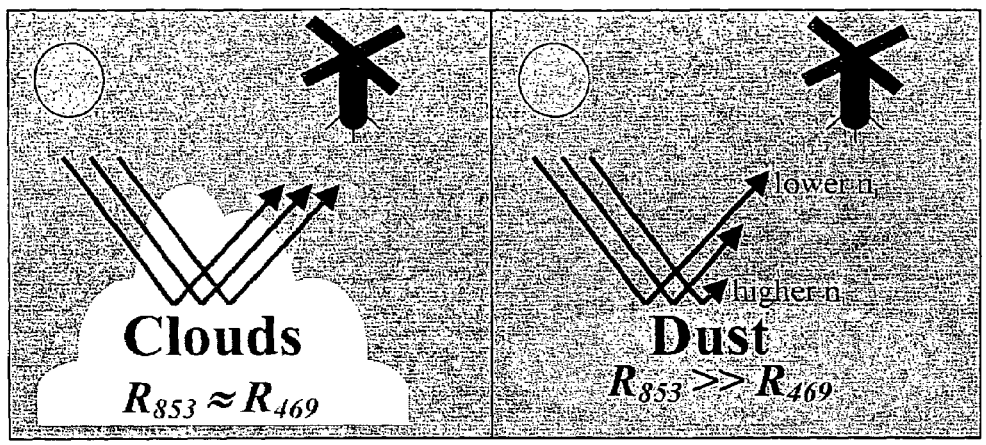
Fig-7 -- Cartoon illustration of preferential absorption of blue light by mineral dust, resulting in yellow reflected light. Clouds scatter more uniformly over the visible wavelengths, resulting in white light

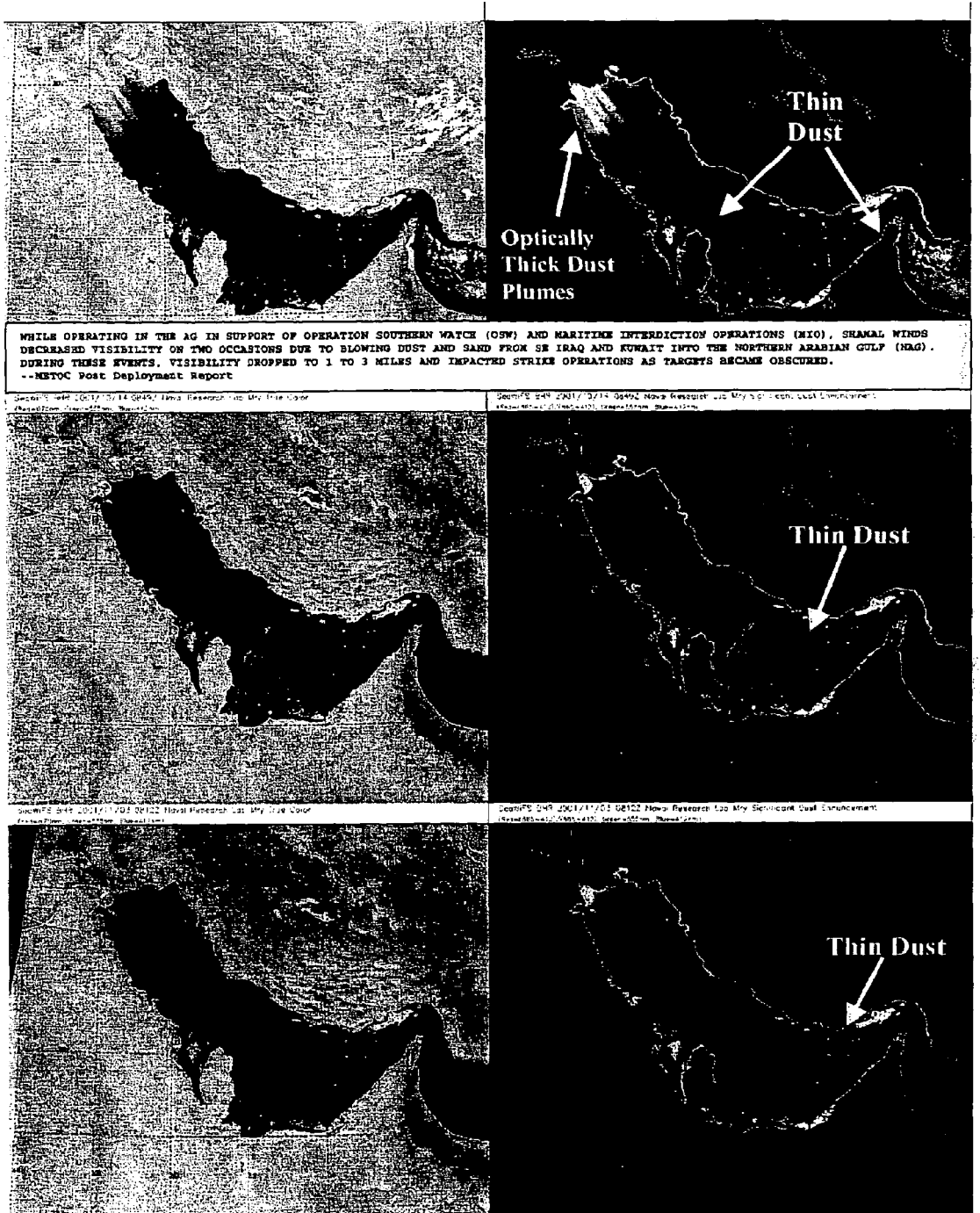
Fig-8 -- Examples of thin dust enhancements over the waters of the Persian Gulf. Optically thin dust plumes appear as darker tones of red. Land regions in the dust enhancement have been masked

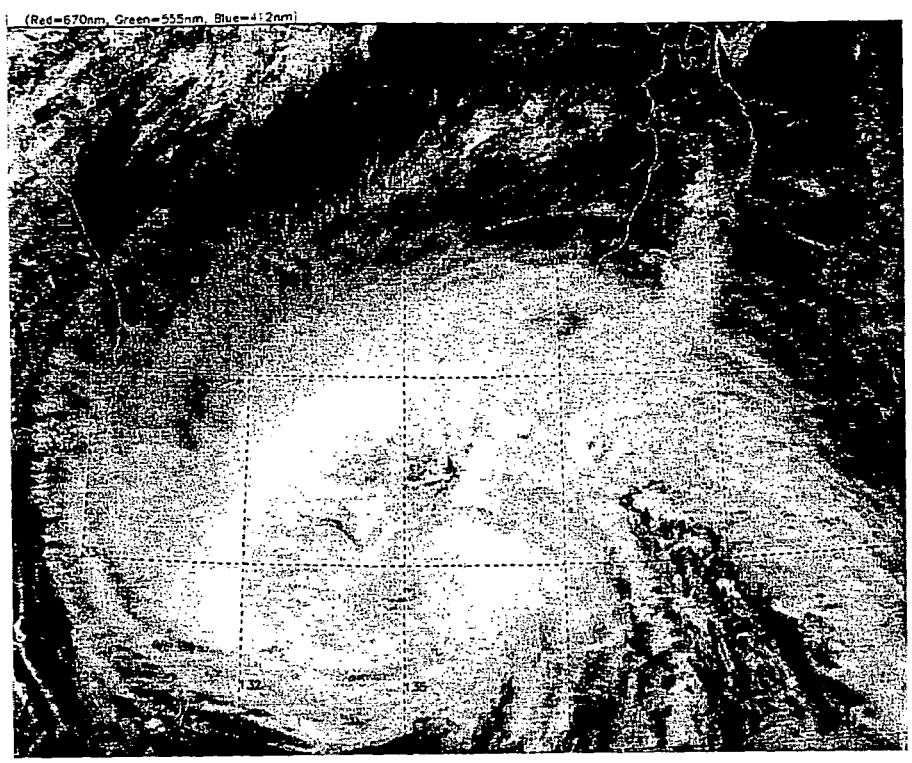
Fig-9 -- True color imagery of Typhoon Pabuk making landfall on Japan

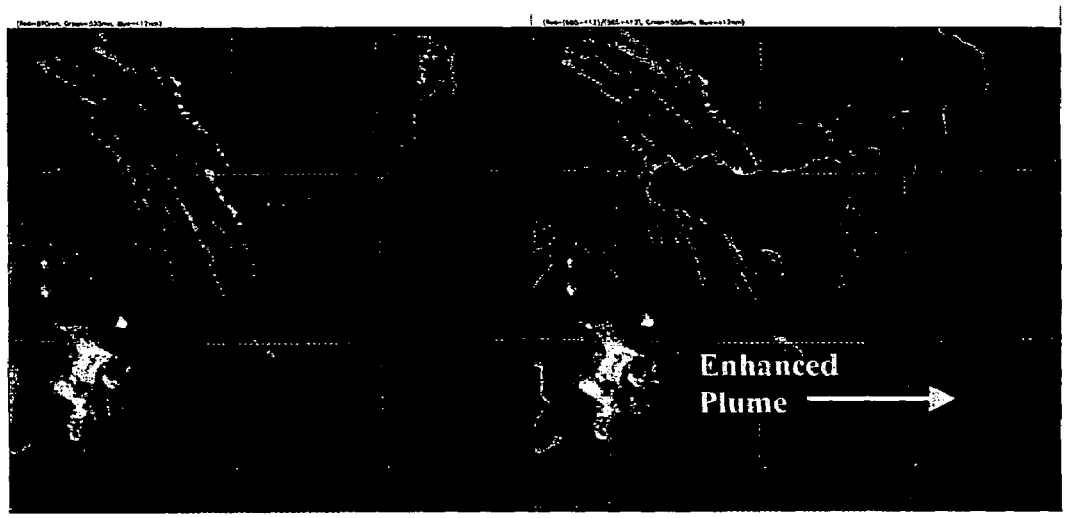
Fig-10 – The enhancement captures a volcanic ash plume from the 2001 eruption of Mt. Etna. Land regions in the dust enhancement have been masked out

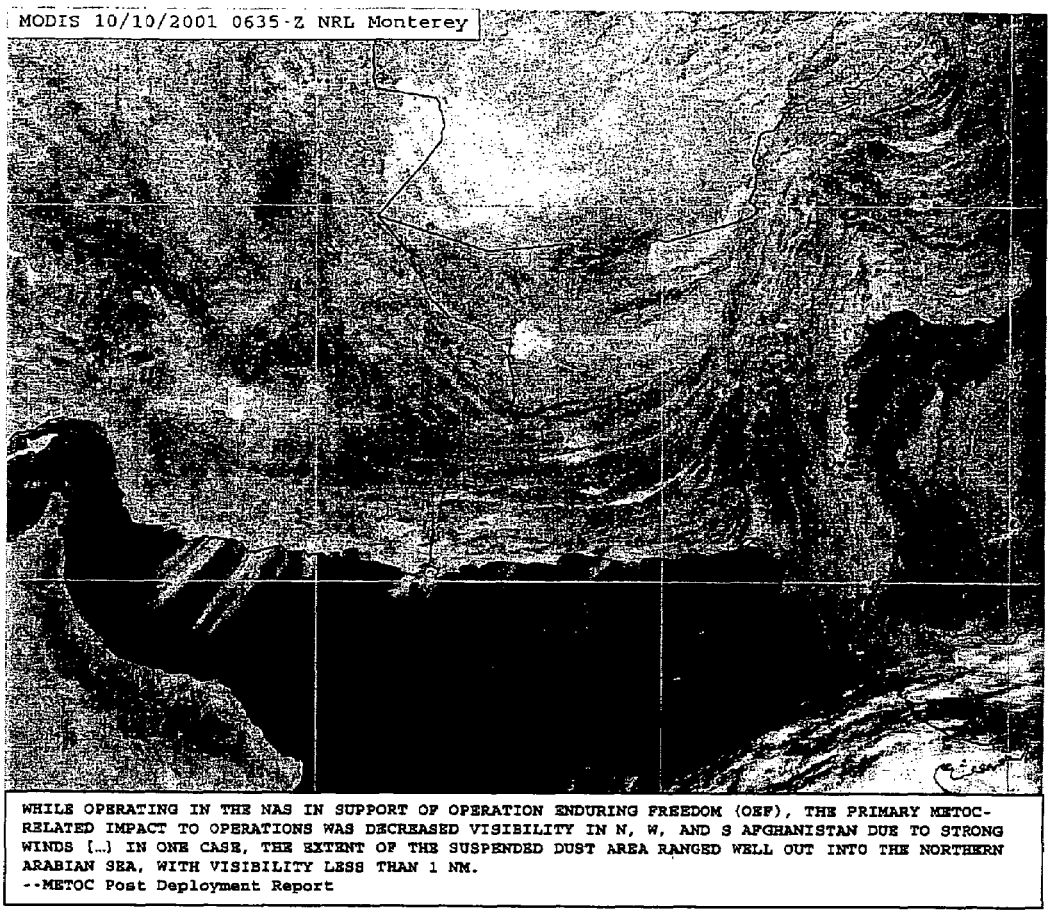
Fig-11 -- MODIS dust enhancement (0.5 km resolution) over the Northern Arabian Sea, true color over land. Dust over the ocean and dry lake beds appear as shades of pink. Accompanying text from Navy MetOc post deployment report corresponding to the storm observed in this image

SYSTEM AND METHOD FOR SIGNIFICANT DUST DETECTION AND ENHANCEMENT OF DUST IMAGES OVER LAND AND OCEAN

The present application is a continuation-in-part of U.S. patent application Ser. No. 10/713,908, filed Jan. 21, 2003 now U.S. Pat. No. 7,242,803.

BACKGROUND OF THE INVENTION

1. Field of the Invention

This invention deals generally with digital enhancement of environmental satellite imagery of airborne dust layers over both ocean and land backgrounds.

2. Description of the Related Prior Art

The detection and tracking of airborne dust from satellite has been of long-standing interest to both the Navy and academia alike, and there is no shortage of papers treating the subject (e.g., Shenk, W. E., and R. J. Curran, 1974: The detection of dust storms over land and water with satellite visible and infrared measurements, Mon. Weather Rev., 102, 830-837. Carlson, T. N., 1978: Atmospheric turbidity in Saharan dust outbreaks as determined by analyses of satellite brightness data, Mon. Weather Rev., 107, 322-335. Legrand, M., M. Desbois, and K. Vovor, 1987: Satellite detection of Saharan dust: optimized imaging during nighttime, J. Climate, 1, 256-264. Jankowiak, I., and D. Tanre, 1992: Satellite climatology of Saharan dust outbreaks: method and preliminary results, J. Climate, 5, 646-656.) These earlier works make use of various spatial and spectral contrast signatures to identify and retrieve properties of dust against land and ocean backgrounds.

A recent study (R. Cantu; "The Role of Weather in Major Naval Aviation Mishaps", MS Thesis, 106 pp., NPS Monterey) finds that poor visibility has factored into approximately 54% of Navy aircraft "Class-A" mishaps, for an estimated annual loss of $51 million. Of these mishaps it was reported that 56% were preventable had better forecasting and/or observational tools been available. The current Dust Enhancement Product represents a paradigm shift in the way dust is observed from the space platform, and is directly applicable to mitigating this multi-million dollar liability.

As noted in the reference listing above, several alternative methods exist for enhancing dust over land and water. Single-channel radiometer imagery with scaling thresholds chosen to enhance a small dynamic range of temperature or reflectance values has been applied to visible and infrared geostationary imagery. The resultant enhancements, usually only of marginal visual quality, are highly dependent on the thresholds chosen and hence not suitable for operations where optimal values for these thresholds may change dynamically over space and time. Combinations of single-channel visible and infrared data is a marked improvement over the scaling described above, but still suffers cloud/dust ambiguity for lack of multi-channel visible data (i.e., the basis for the over-water Dust Enhancement Product, which requires blue and short wave infrared channels). The Empirical Orthogonal Function (EOF, or sometimes referred to as "principle component") method has been shown to do a good job of enhancing dust over land and water. However, results produced by this method again are highly dependent on the variability of the scene and hence will provide an inconsistent enhancement depending on background and dimension of the region. Spatial contrast reduction, which takes advantage of the blurring effect of dust over otherwise sharply-defined terrestrial features, has been applied successfully for dust detection over land, but often fails over laminar ocean backgrounds and is limited over land in regions where the terrain is less variable (e.g., desert plains, where dust incidentally is most common).

None of the previous methods enlist multi-channel visible data to take advantage of the inherent spectral variability of dust at these wavelengths, due primarily to the unavailability of such data at the times of those writings. The unified land/ocean Dust Enhancement Product is a novel solution to the daytime dust detection problem. In comparisons between the visible/infrared combination technique (e.g., as is applied to Meteosat 5 data) and the current algorithm (applied to Terra-MODIS data) for a space and time co-located dust storm event in Southwest Asia has revealed superior detection of dust by the current method over both land and water. As such, the new technique is thought to be of immediate relevance to Navy Meteorology/Oceanography (METOC) operations in several regions of the world that experience significant dust outbreaks (including Southwest Asia, Africa, the Mediterranean, and the West Pacific).

SUMMARY OF THE INVENTION

The dust enhancement system of the invention is designed to provide an indication of the horizontal distribution of airborne dust layers over both land and water surfaces for daytime scenes. The regions of dust are enhanced as shades of pink, depending on opacity, against darker non-dust backgrounds (e.g., green land, dark blue water, and cyan clouds).

The primary advantage of the Dust Enhancement Product is its ability to call immediate attention to areas where significant concentrations of airborne dust reside, particularly in regions where even the true color imagery experiences great difficulty in discerning. The enhancement highlights mesoscale circulations in optically thin dust over water, and is also useful for identifying volcanic plumes (e.g., Mt. Etna Jul. 26, 2001 eruption—image attached). The latter capability is of particular relevance to both military and civilian aviation. The algorithm is applicable to a wide range of ocean color instruments in the ocean-only mode (i.e., true color over land surfaces) or in the ocean/land mode provided infrared information is available either on the same platform or co-registered with temporally matched imagery from an independent observing system.

The new dust enhancement technique is in fact a combination of two independent enhancement algorithms—one applicable to water backgrounds and the other to land backgrounds. It is based physically on the premise that silicate aerosols (e.g., mineral dust common to desert sandstorms) preferentially absorb blue light compared to green and red light, whereas cloud particles (liquid or ice) are more or less non-absorbing across this region and reflect all three components strongly. Therefore, a spectral difference between red and blue light will be much larger for dust than for clouds. In this way, data from a radiometer with spectral resolution capable of measuring independently the red, green, and blue components of reflected solar energy can be combined to further enhance and decouple the dust signal from clouds. Over water, the spectral difference is normalized by the magnitude of the reflectance such that additional sensitivity to thin (low reflectance) dust is achieved. The approach requires correction of the multi-channel data to remove scattering contamination from the molecular atmosphere prior to computing the enhancement.

Because the land background possesses similar spectral properties to the airborne dust at visible/shortwave-infrared wavelengths, the simple ocean-component described above is insufficient for identifying dust over land. The new technique includes thermal contrast and spectral transmittance property differences, which require channels in the infrared part of the spectrum. With its 36 narrowband channels spanning the optical portion of the electromagnetic spectrum fro 0.4 to 14.4 micrometers, MODIS is well equipped to exploit these techniques from a single platform (although the Dust Enhancement Product may be achieved by combining registered data from a collection of independent platforms).

The three factors contributing to the over-land component of the Dust Enhancement Product are outlined as follows: During the day, cooler emissions from an elevated dust layer contrast against the warm emissions from a heated surface. The same temperature signature holds true for clouds, but the same spectral decoupling applied to the over-ocean enhancement applies also to clouds over land. Combining the temperature and shortwave-differences provides a means to detecting the optically thick portion of the dust plume. Optically thin regions of dust will not produce a strong infrared temperature depression. However, spectral differences in thermal (11.0-12.0 micrometers) transmission for dust are very useful in determining areas of thin dust. The signature is opposite in sign to that of thin cirrus. Combining these multispectral features together yields a tractable algorithm for the enhancement of dust over land. Although the land and water enhancement algorithms differ significantly, the land enhancement has been formulated such that dust over land is the same hue (shades of pink) as dust over water with minimal discontinuity in saturation across coastal boundaries.

The techniques of the invention demonstrate that the current enhancement, as applied to the Sea-viewing Wide Field-of-view Sensor (SeaWiFS) radiometer (over water only) and MODIS (water and land), has significant potential to benefit the warfighter through its ability to provide through high spatial resolution satellite imagery a detailed depiction of atmospheric dust outbreaks with enhancements for optically thin regimes, as well as other meteorological/land-surface features of interest (e.g., clouds, fires, snow cover). Based on these findings, NRL and Fleet Numerical Meteorology and Oceanography Center (FNMOC) have collaborated to host a subset of these products upon the FNMOC Secure Internet (SIPRNET) beta-webpage for the purpose of i) making this new technology available to Navy assets, and ii) receiving feedback useful for improving upon its current utility.

BRIEF DESCRIPTION OF THE DRAWINGS

FIG. 1—The SeaWiFS sensor (left) flying aboard the SeaStar platform (right)

FIG. 2—Raw SeaWiFS data from a Navy Regional Center (NRC) receiving station (left) and the noise/line corrected equivalent (right)

FIG. 3—SeaWiFS High Resolution Picture Transmission (HRPT) true color image of the Eastern Atlantic Ocean, Iberian Peninsula, and Northwestern Africa, captured by NRC in Rota, Spain (Feb. 13, 2001, 1255Z). A large dust plume wrapping into a baroclinic system is indicated FIG. 4—SeaWiFS HRPT true color image of the Persian Gulf area, captured by NRC in Bahrain. Airborne dust is indicated. Phytoplankton is responsible for the green pigmentation in the littoral regions FIG. 5—SeaWiFS HRPT true color image of the Korean Peninsula, captured by NRC in Yokosuka Japan. Yellow arrows indicate areas of biomass smoke/pollution FIG. 6—True color (top) and vegetation enhancement (bottom). Bright red indicates regions with abundant plant life. Note seasonal changes in Fall vegetation compared against Summer (FIG. 5)

FIG. 7—Coceptual illustration of preferential absorption of blue light by mineral dust, resulting in yellow reflected light. Clouds scatter more uniformly over the visible wavelengths, resulting in white light FIG. 8—Examples of thin dust enhancements over the waters of the Persian Gulf. Optically thin dust plumes appear as darker tones of red. Land regions in the dust enhancement have been masked FIG. 9—True color imagery of Typhoon Pabuk making landfall on Japan FIG. 10—The enhancement captures a volcanic ash plume from the 2001 eruption of Mt. Etna. Land regions in the dust enhancement have been masked out FIG. 11—MODIS dust enhancement (0.5 km resolution) over the Northern Arabian Sea, true color over land. Dust over the ocean and appear as shades of pink. Dry lakebeds over land appear as patches of pink. Accompanying text from Navy MetOc post deployment report corresponding to the storm observed in this image FIG. 12 Enhancement of dust lifted by strong post-frontal winds in the Desert of Southwest North America. Visible channel imagery (top) is contrasted against dust enhancement (bottom), revealing several point sources causing downwind plume.

DETAILED DESCRIPTION OF THE INVENTION

Figure 12:
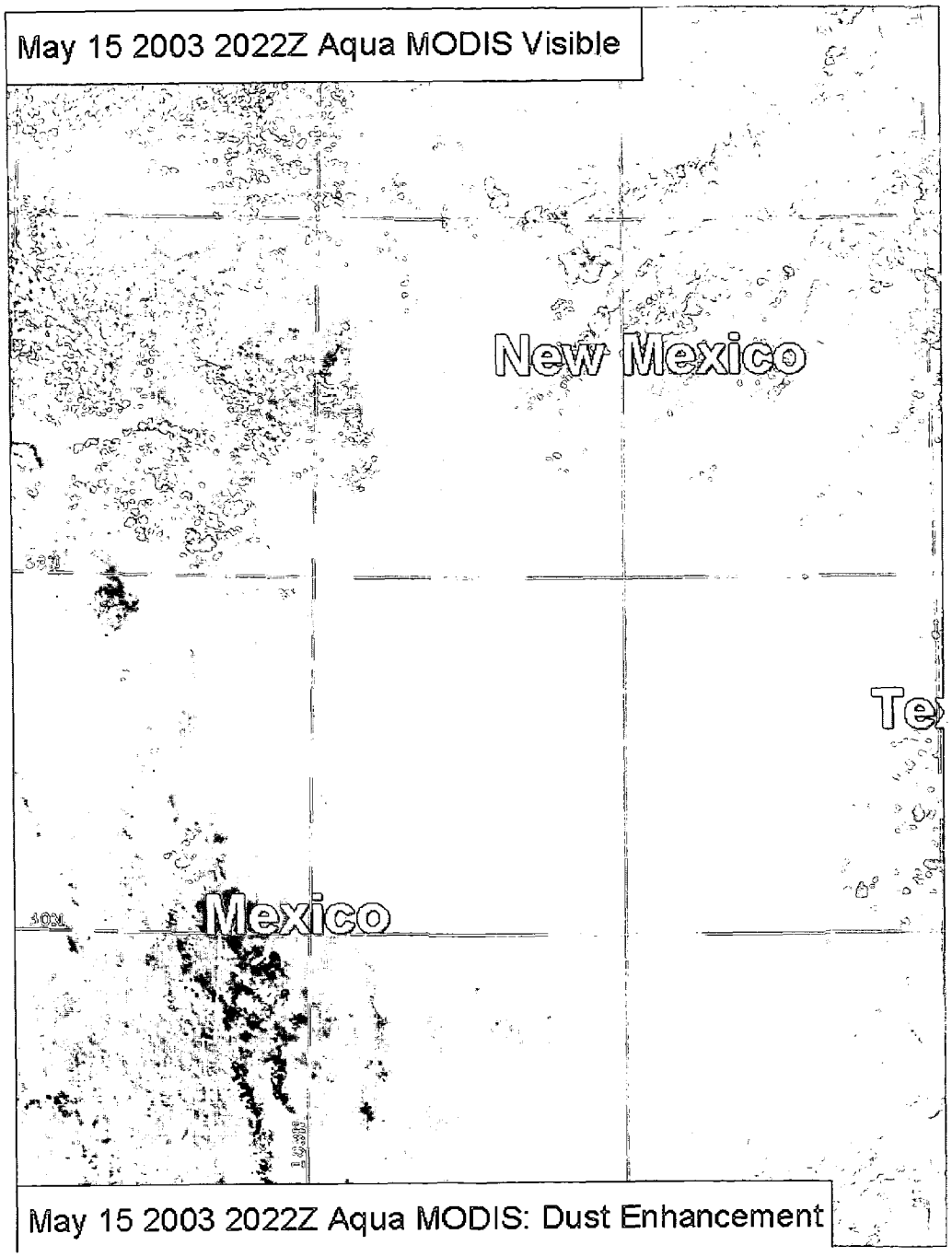

The Satellite Meteorological Applications Section at the Naval Research Laboratory (NRL) in Monterey has developed true color, vegetation enhancement, and airborne sand/dust enhancement processing capabilities for the Sea-viewing Wide Field of View Sensor (SeaWiFS) instrument. These products are made in near real time (typically 60 to 90 minute latency from time of ingest at the receiving stations) using telemetries captured at Navy Regional Centers (NRCs) located in Spain (Rota), Bahrain, and Japan (Yokosuka), and populate a password-protected website for several predefined sectors within the general coverage regions of these centers. Presented here is an overview of the SeaWiFS sensor and its capabilities/limitations, a summary of the procedure, and the current processing architecture. Examples drawn from the archived database (automated processing of these data commenced Aug. 8, 2001) are presented to illustrate their quality and potential operational utility.

Platform/Instrument Specifications

The SeaWiFS instrument (Firestone and Hooker, 1996), launched aboard an extended Pegasus rocket on Aug. 1, 1997, is an 8-channel whiskbroom scanning radiometer featuring 8 narrowband (~20 nanometers (nm) wide) spectral channels centered at 412, 443, 490, 510, 555, 670, 765, and 865 nm wavelengths. Carried aboard the SeaStar spacecraft (see FIG. 1), SeaWiFS follows a sun-synchronous (98.3° inclination, 705 kilometer (km) altitude above mean sea level (AMSL)) orbit with a local noon descending equatorial crossing time. It has a local-area-coverage (LAC) swath width of 2801 km (corresponding to a maximum scan angle of 58.3°) and a nominal spatial resolution of 1.1 km at nadir. Global Area Coverage (GAC) is also available at 4 km degraded resolution and a reduced 1502 km swath (data limited to 45° scan angle). The 10-bit digitized data are transmitted down to Earth at an L-band frequency of 1.70256 Gigahertz (GHz). The instrument scans across 1285 picture elements at a rate of 6 Hz. Typical High Resolution Picture Transmission (HRPT) station telemetries include typically 4000 to 5000 scan lines of data (depending on local topographical/anthropogenic obstructions), translating to 11-13 minutes of capture time from the nominal initial-capture time stamp on the filename.

The primary function of SeaWiFS is to detect and monitor ocean color. Specifically, it has been designed to retrieve the small component (~5% of total signal) of water leaving reflected radiance whose spectral signature provides useful information about ocean phytoplankton content (expressed in terms of chlorophyll-A retrievals). A varying along-track sensor tilt angle of +/−19.8° is used to avoid regions of sun glint (specular reflection of the solar disk upon the ocean surface) where chlorophyll-A retrievals cannot be performed. The information obtained from such retrievals is valuable to marine research and industry interests. Applications include guidance to the fishing industry, diver visibility information, surface currents, physical oceanography, general marine biology, and climate impacts on the marine ecosystem. While atmospheric constituents such as cloud, dust, and aerosol are considered as noise to ocean color algorithms, the current research regards these components as the signal of interest. This description of the invention report details how SeaWiFS data are applied to enhance atmospheric and surface features/phenomena.

Instrument Advantages

The main advantage provided by SeaWiFS over optical spectrum instruments flown on the geostationary (e.g., the Geostationary Operational Environmental Satellite (GOES) constellation, Meteosat 5,7, Geostationary Meteorological Satellite (GMS), and the Indian National Satellite System (INSAT)) and other polar orbiter (e.g., National Oceanographic and Atmospheric Administration (NOAA), Defense Meteorological Satellite Program (DMSP), and many others) platforms for the current application is its multiple narrowband visible channels that provide a true color imaging capability.

Instrument Limitations and Other Caveats

The main deficiencies of SeaWiFS in terms of 24-hour operational utility are its lack of infrared channels, its limited temporal resolution, and proprietary nature. Infrared data are useful for nighttime imaging, cloud particle size estimation, and airborne dust enhancement over land surfaces, among other uses. At mid to low latitudes, only one to three passes are available near local noon—providing at best a "snapshot" of the synoptic-scale situation on any given day. Captures are increasingly frequent at the higher latitudes owing to the orbital geometry. Typical captures for the regional centers currently processed are on the order of 2 to 3 per day. Thus, SeaWiFS products are most useful when juxtaposed with geostationary data that offer the temporal information required to infer details of the atmospheric circulation.

Because SeaWiFS was built, launched, and operated by Orbital Sciences Corporation (OSC), the data are formally available to the general public on a research-only basis and are provided at cost. The National Aeronautics and Space Administration (NASA) has contracted with OSC for the research use of a 5-year data set commencing in September 1997. Researchers who have registered as authorized SeaWiFS user (registration at http://seawifs.gsfc.nasa.gov/SEAWIFS.html) are granted permission to obtain the data from the NASA SeaWiFS archive, approved NASA Space Act Agreement ground station, or authorized individual. As authorized receiving stations, the NRCs providing near-real-time LAC data for this research are covered under the existing agreement, with the only criterion being that NRL does not disseminate the LAC-derived products to the general public in near real-time.

Data Processing

Several options exist for processing the SeaWiFS telemetry, depending on the format of the data. The formats currently received at NRL are NASA Level-0 (L0; 10-bit Data Capture Facility frame-formatter files), with Terascan Data Format (TDF) (pre-calibrated and navigated) upon special request. Data from the NRCs are in NASA L0 format, and require several preprocessing steps to calibrate and navigate the data as described below. For reasons described further along, the current approach to creating SeaWiFS products is based on NASA L0 data and is independent of the Terascan software package. Several approaches have been iterated upon in arriving at the current procedure including various blended combinations of software packages—some more appropriate for rapid deployment to remote operational centers and others geared toward in-house processing with all the conveniences of locally available third party software. While the purpose of this description is to summarize the current approach, alternative options and their associated data/software requirements will be touched upon in passing.

Worth noting is that the Perl programming language, running on the Linux platform, was selected as the scripting language for automated processing of SeaWiFS data. Perl draws from the strengths of many popular scientific programming languages such as C++ and Fortran while enhancing on the capabilities of other standard shell scripting languages. The Perl scripts written in support of the current SeaWiFS processing perform the requisite secretarial operations of data retrieval, file and directory manipulation, execution and status monitoring of telemetry updating and data processing codes, dissemination of imagery products to the website, and general housekeeping. Perl remains the lone constant among all processing options discussed in this report.

SeaDAS Processing Option

One of the available SeaWiFS processing options is the GSFC SeaWiFS Data Analysis System (SeaDAS) software package (Fu, G., K. S. Baith, and C. R. McClain, 1998: SeaDAS: the SeaWiFS data analysis system, *Proc. of 4$^{th}$ Pacific Ocean Remote Sensing Conf*, Qingdao, China, Jul. 28-31, 1998, 73-79), which was designed specifically for viewing and basic manipulation of SeaWiFS data. It uses an embedded runtime Interactive Data Language (IDL) license as its operating paradigm. The SeaDAS software is designed to operate on NASA L0, Level-1A (L1A; raw spacecraft and instrument telemetry retained with converted geo-location, instrument telemetry, and selected spacecraft telemetry), and Level-1B (L1B; sensor calibration applied to the data). L1A and L1B data are stored in Hierarchical Data Format (HDF). The software includes a graphical user interface enabling straightforward viewing and manipulation of the data, as well as command-line functions useful for incorporating into scripts as batch jobs. The SeaDAS package was used early on in this research to examine the general utility of SeaWiFS data in terms of coverage and data quality before proceeding with customized application. While SeaDAS is not used in the current processing (in the interest of gaining a higher level of control over product display options), several functions were adopted from this package for conversion from NASA L0 to L1B HDF files and data correction. SeaDAS remains an extremely useful stand-alone tool for SeaWiFS data visualization, and is available via the Internet at http://seadas.gsfc.nasa.gov. The website includes versions of SeaDAS for several operating platforms and has a limited level of helpful online support.

The Currently Implemented Processing Scheme

A simple overview of the current processing flow is as follows: I) SeaWiFS LAC telemetry captured at an NRC site and converted immediately to NASA L0 formatted file, II) Data sent to the satellite data storage facility at Naval Oceanographic Center (NAVO) at Stennis Space Center in Mississippi via file transfer protocol (ftp) push, III) Data are pushed via ftp to NRL Monterey from NAVO, IV) A periodic local cron job searches for receipt of new files, and if found: V) SeaWiFS processing script commences to calibrate, clean, apply atmospheric corrections, and generate products, VI) Products are uploaded to a password protected NIPRNET website. Latency of near real-time products is generally on the order of 1.5 hours from time of ingest at the NRC site. The remainder of this section provides additional details on the steps outlined above.

NRC Stations

The mid-latitude NRCs included in the current NRL processing are Rota [36.63N, 6.34E], Bahrain: [26.16N, 50.39E], and Yokosuka [35.28N, 139.67E]. Each station captures SeaWiFS passes on or around its local noontime hours (1100-1400 Z for Rota, 0700-1000 Z for Bahrain, and 0130-0430 Z for Yokosuka). NRL receives the NASA L0 data from NAVO as Gnu-compressed files typically 1 hour after the nominal capture time. File sizes vary according to pass coverage, with typical values ranging from 20 to 80 Megabytes. The 55 Gigabyte hard drive currently used as a storage bay for raw data, algorithms, and products is sufficient for several months of online storage. All data are eventually archived to CDROM or tape storage in a hierarchical structure partitioned by station, year, month and day.

Data Calibration

A cron job launched every half hour initiates the processing of newly received SeaWiFS data. A loop over all files present in the ftp "receive directory" checks for any new and unprocessed data. If a new file has arrived, it is uncompressed and copied to the local storage drive for subsequent processing to L1B calibrated radiances (expressed in mW/cm$^2$-sr-µm). Binary executables taken from the SeaDAS software package are used for this purpose, and require an updated SeaStar ephemeris for correct earth location (SeaWiFS requirement of 1-pixel geolocation accuracy). These data are available at ftp.samoa.gsfc.nasa.gov, and are updated on the local system if the current elements file is found to be more than one day old. Any errors incurred during the uncompressing or calibration steps are reported to a log file and the script is exited gracefully.

Sector Definition and Noise Corrections

Upon completion of L1B processing, an IDL script for customization of the data is spawned. Latitude, longitude, sun/sensor geometry, and SeaWiFS channel variables are extracted from the HDF data. A table of pre-defined sectors for each station is included and readily updated for new operational areas of interest or one-time case studies. Definition of these sectors is based on the specification of latitude/longitude boxes (lower left and upper right corners). Owing to the scanning geometry, regions near the edge of the swath suffer spatial resolution degradation. As a result, imagery for these pre-defined sectors may include only partial coverage at compromised quality. A minimum data check of 20% coverage over the sector in question is enforced prior to proceeding with the processing. To ensure that the optimal information content for every SeaWiFS pass is provided, a "floater" sector is included which selects a box data away from the swath edges (poor resolution) and the horizons (avoiding numerous scan line drop-outs). The trade off for high image quality is a random coverage area from pass to pass.

Once the sector of interest has been defined (or loops over numerous sectors), an embedded loop over SeaWiFS channels is performed for corrections of pixel noise and line dropouts. Noisy pixels appear in the imagery as a "salt and pepper effect" owing to the presence of spurious very high or very low data values. Line dropouts appear in imagery as black scan lines devoid of data or filled with noise. These imperfections are present in the data due to a combination of possible hardware limitations/problems and clutter associated with nearby structures. Cleaning of the data is accomplished in two ways. Lines identified as dropouts are replaced by previous good scan lines (bad lines at the very beginning or end of a data stream are replaced by their nearest good neighbor). If multiple adjacent dropouts are present, the previously patched line is used once again. This correction loses its cosmetic effectiveness for large data gaps, but provides marked improvements in cases of spurious line dropouts. Noisy pixels, assumed to be spurious, are identified using a threshold based on the absolute values of pixel derivatives computed along a scan line. When flagged, they are replaced by an average of the two adjacent pixels on the same scan line. Noise pixels on the edges of lines are simply replaced by the value of their nearest neighbor. FIG. 2 illustrates the result of corrections applied to a subsector of SeaWiFS data collected over the Alps. The overall effect of these bad line and pixel noise corrections is dramatic, and regarded as an essential step in the production of high-quality SeaWiFS imagery. Additional noise corrections (not yet implemented) may be required to correct pixels where one of the channels is missing data (but was not flagged by the noise threshold). This results in a magenta, yellow, or cyan-biased pixel values in the RGB products.

Atmospheric Corrections

The effects of atmospheric molecular (sometimes referred to as "Rayleigh") scattering must be removed from the data before creation of true color products. The amount of Rayleigh scatter is proportional to $\lambda^{-4}$ (wavelength) and hence is strongest for the shorter (e.g., blue, violet) wavelengths. If left uncorrected it will manifest in the imagery as a semi-transparent milky blue haze increasing in opacity toward the edges of the swath (as higher sensor angles peer through an optically thicker atmospheric path), detracting from image contrast and clarity. To remove this undesirable component of the satellite signal, we use a radiative transfer model (Miller, S. D., G. L. Stephens, C. K. Drummond, A.

K. Heidinger, and P. T. Partain, 2000: A multisensor diagnostic cloud property retrieval scheme, *J. Geophys. Res.*, 105, No. D15, 1995-1997) to simulate the clear sky Rayleigh scatter over a dark surface as a function of the solar zenith, satellite zenith, and solar-satellite relative azimuth angles. Pre-calculated look-up tables were created for each Sea-WiFS channel and the correction was applied on a pixel-by-pixel basis, provided the sun/satellite geometry in the Level 1B data. The primary caveat associated with this correction is the assumption of a cloud-free Rayleigh contribution that in some instances may result in an overcorrection of pixels containing high clouds near the edges of the swath. Visual inspection of imagery has not indicated a significant distortion owing to this effect, however. Regions near the edge of the SeaWiFS swath should in general be interpreted with cautious regard to the possible distortions owing to larger atmospheric path lengths, three-dimensional effects (parallax), and possible bow-tie effects.

Scaling

Once the data have been calibrated, cleaned of noise, and corrected for Rayleigh scatter, the spectral radiances ($I_\lambda$) are converted to equivalent isotropic reflectances ($R_\lambda$) according to the relationship:

$$R_\lambda = \frac{\pi I_\lambda}{\mu_o F_{o,\lambda}}, \quad (1)$$

where $\mu_o$ is the cosine of the solar zenith angle and $F_o$ is the solar spectral flux at wavelength $\lambda$. By definition, the isotropic reflectance represents the reflectance produced by an equivalent lambertian surface, and varies from 0.0 to 1.0. Any spurious values greater than 1.0 or less than 0.0 are thresholded by these upper and lower bounds. The reflectances are scaled by $\log_{10}$ in an attempt to equalize the imagery and prevent the very bright cloud/snow pixels from dominating the information content of the products. These scaled reflectances are byte-scaled over the 256-element color table range of the IDL palette, with a minimum logarithmic reflectance of −1.65 mapped to the minimum saturation value (0) and 0.0 mapped to the maximum (255). This procedure is detailed in the computer program code listing in the Appendix.

The scaled data are warped to a mercator projection corresponding to the sector of interest. This procedure is currently the most computationally time-consuming component of the processing, and options for optimization or alternative approaches are currently being explored.

The final image products are created as jpegs at 80% of full quality. File sizes range from 200 to 800 Kilobytes depending on the sector and image information content. The true color, vegetation enhancement, and dust enhancement products for various stations and subsectors are copied to a password-protected online holding directory on the NRL Satellite Meteorology web page (http://kauai.nrlmry.navy.mil/sat_products.html).

True Color Enhancement

To produce the true color images, the blue (412 nm), green (555 nm), and red (670 nm) SeaWiFS data are loaded into the respective blue, green, and red IDL "color guns." The data comprise a single matrix of dimension (n,m,3) where n=along-scan direction and m=along-track direction. The resultant imagery is similar, but not identical, to what would be observed by the human eye from the vantage point of outer space; clouds as shades of gray to white, ocean surfaces as shades of blue, and land features as earth-tones and green in regions of heavier vegetation.

Examples of true color SeaWiFS imagery are shown for the Rota, Bahrain, and Yokosuka regional centers in FIGS. 3-5, respectively. FIG. 3 demonstrates the immediate ease with which significant airborne dust is identified over oceans. The image depicts a widespread easterly plume of Saharan dust captured within the synoptic flow of a baroclinic system off the coast of Spain and Portugal. SeaWiFS is useful in monitoring these dust plumes as they migrate across the Atlantic Ocean (often reaching the eastern United States). The green colors in littoral regions of the Persian Gulf in FIG. 4 correspond to a higher amount of bioactivity (e.g., plankton) in nutrient-rich waters. Cloud streets over land and evidence of biomass burning in the form of diffuse smoke plumes are apparent over Southeastern Asia in FIG. 5. The NRC in Yokosuka also captures seasonal dust storms blowing off the Gobi desert. Owing to the general circulation of the atmosphere, large Gobi and Saharan dust storms may reach the continental United States (the former crossing the Pacific with the "Roaring Fourties", and the latter crossing the Atlantic with the Tropical Trades.

Vegetation Enhancement

Because green vegetation possesses a relatively high albedo compared to soil in the "reflective" or shortwave infrared (0.7-1.3 μm), a combined vis/shortwave-IR product that enhances vegetation regions is generated in a way similar to the true color enhancement described above. This vegetation enhancement product is similar to what has been produced for many years for land-usage studies with Landsat TM data. The 670 nm (red) channel in the previously discussed RGB true color enhancement is replaced by the 865 nm (SeaWiFS channel 8) channel data. This results in green vegetation appearing as bright red and appears usually in sharp contrast to surrounding regions devoid of vegetation. An example of this product is shown in FIG. 6. The vegetation enhancement may prove useful in identifying potential fetch areas for airborne dust.

Airborne Dust Enhancement

An important capability of SeaWiFS, resulting from its multiple narrowband visible channels and indicated in the examples above, is discrimination between airborne dust and clouds/smoke via true color methods. Fine-grain particles lifted from sparsely vegetated and dry desert surfaces by strong frictional winds (typically greater than 10 m/s, usually by meso- and synoptic-scale circulation features) give rise to significant plumes of atmospheric dust. These plumes follow the low to mid-level atmospheric circulation and may also become incorporated within synoptic scale baroclinic systems (giving rise on occasion to unusually "mud rain" storms that have been reported to deposit a coating upon everything in their path).

Perhaps more importantly to Navy interests, airborne dust has significant detrimental impacts on slant-range visibilities (with visible optical depths that can exceed 3.0 and accompanied by visibilities less than 1 nautical mile) and also poses a serious hazard in terms of its potential to damage turbine engines. This is of particular relevance to aircraft carrier operations in regions of the world prone to widespread dust outbreaks. Because airborne dust retains the earth tone hues (usually light brown or yellow, depending on the source region) of the underlying surface, it is readily identifiable in most cases from a true color image, especially for optically thicker dust plumes. For regions of less dust (where its effects on slant range visibility may still be appreciable), an additional enhancement beyond true color is required. NRL Monterey has developed a dust enhancement algorithm for SeaWiFS that attempts to provide this capability. Enhancement of dust is predicated on basic spectral properties that characterize its appearance at visible wavelengths. As indicated in FIG. 7, yellow light (characteristic of many desert dust plumes) results from the removal of blue light (via preferential absorption by the dust). This spectral contrast is even more dramatic between the blue and shortwave infrared channels. This preferential absorption does not occur to the same magnitude in liquid/ice clouds (explaining why clouds appear as shades of gray to white, indicating nearly equal reflected intensities of red/green/blue light, in a true color composite). By defining a dust enhancement parameter "Δ":

$$\Delta = \frac{\alpha_{865} - \alpha_{412}}{\alpha_{865} + \alpha_{412}},$$

where $\alpha_\lambda$ are reflectances at wavelength λ (nm), any dust component of the image will be enhanced. Cloud pixel values, which are relatively spectrally flat, will be diminished in brightness owing to the small numerator difference. The logarithm of the Δ parameter is scaled between −0.45 and 0.20 and loaded into the red channel of the RGB composite.

Owing to the significantly reduced red component for cloud pixels in the dust enhancement (small values of the Δ parameter) image, clouds typically appear as shades of light blue or cyan. Retaining the original gray/white cloud hues in the dust enhancement (for cosmetic purposes only) requires the implementation of a simple cloud mask—pixels flagged as cloudy can be re-assigned to their original red channel values. Clouds in the imagery are identified first by computing the mean scaled magnitude and standard deviation of the 412, 555, and 670 nm channels. Mean magnitudes exceeding 50% and standard deviation less than 2.5% are used as thresholds for positive cloud identification. The simple premise behind choosing these thresholds is that clouds are in general bright (high brightness magnitude) and relatively spectrally flat over the visible (low standard deviation). Pixels flagged as "cloudy" are reset to the red channel value in the Δ parameter. As the dust enhancement enhances land surfaces also, a land mask is applied to this product.

FIG. 8 demonstrates the dust enhancement product covering the Persian Gulf region. The top panel pair reveals that while the true color imagery is useful in identifying the significant dust plumes, the dust enhancement reveals a far more extensive coverage of airborne dust circulating within the Gulf. The center and lower panel pairs further illustrate this enhancement capability. While not necessarily posing the same hazard to aircraft engines as the optically thick (bright) plumes, these areas of enhanced aerosol have detrimental impacts on slant-range visibility. Although more difficult to detect than over the oceans, the presence of significant dust over bright and/or sparsely vegetated land surfaces can in some cases be inferred by noting contrast reduction in the background terrain. The lack of an infrared channel on the SeaWiFS instrument precludes the technique of detecting elevated (cooler) dust above a warm surface background via emission measurements. The utility of EOS-MODIS, which provides 36 channels (including narrowband red, green blue, NIR and LWIR bands), will be explored in this capacity.

Other Utilities

The global coverage afforded by the polar orbiting platform provides SeaWiFS with opportunities to survey many atmospheric and terrestrial phenomena. Its utility as an additional sensor for tropical storm monitoring (e.g., Typhoon Pabuk shown in FIG. 9) may increase in relevance in light of the current mechanical problems aboard the Geostationary Meteorological Satellite (currently providing coverage of the Tropical Western Pacific and the primary satellite observation platform supporting the Joint Typhoon Warning Center). Unexpected events provide unique opportunities to examine additional capabilities of the SeaWiFS channels. The eruption of Mt. Etna, shown in FIG. 10, demonstrates an additional utility of the dust enhancement product—revealing features of the ash plume difficult or impossible to detect in panchromatic or even true color renditions. Depending on their composition and concentration (not all volcanic plumes are comprised of materials that will be enhanced by the currently detailed dust enhancement), such plumes may be tracked around the globe, providing invaluable guidance to the commercial airline industry for avoiding these potentially serious flight hazards. The detection capabilities of SeaWiFS offer a valuable asset to Volcanic Ash Advisory Centers (VAACs; e.g., http://www.ssd.noaa.gov/VAAC/washington.html) distributed world-wide whose charter is to monitor and track these plumes globally, and also the Geneva-based World Meteorological Organization (WMO; e.g., http://www.wmo.ch/indexflash.html), which coordinates global scientific activity among an international panel of participants.

New Processing Formats

The SeaWiFS processing as discussed in this description is well suited for the creation and analysis of high quality SeaWiFS imagery products in an automated, near real-time framework.

For the reasons cited above, efforts to reproduce this processing in a fashion entirely independent of third party software have resulted in an analogous package that assumes receipt of SeaWiFS data in TeraScan Data Format and proceeds to customize the data in the FORTRAN-90 programming language. True color and dust enhancement image rendering is then completed using the "rgbimage" TeraScan intrinsic function. This FORTRAN-based version is actually more efficient and hence runs faster than its IDL counterpart.

Blended Products

SeaWiFS is only one of several telemetries available for processing at NRL Monterey. It is a straightforward procedure to incorporate data from these other sensors within the same image to produce a multi-sensor product. For example, the masked-out land areas in the dust enhancement product may be filled in by temporally matched geostationary data (e.g., Meteosat 5 over Bahrain, MeteoSat 7 over Rota, and GMS over Yokosuka). Infrared information can be used to enhance regions of elevated dust over the land in certain situations. As NRL also has at its disposal analysis and forecast data from its mesoscale (Coupled Ocean-Atmosphere Mesoscale Prediction System)™ and global scale (Navy Operation Global Atmospheric Prediction System) models, it may also prove useful to blend these data into the products. Using again the example of the dust enhancement product, inclusion of the COAMPS™ 925 mb wind field in the form of vectors overlaid upon the imagery may serve not only as a qualitative validation of the model analysis but also provide the METOC officer in the field with a means to predicting the migratory behavior of significant dust plumes in the short term. Overlay of short-term forecasts of the frictional wind over land (winds near the surface that are responsible for lifting the dust into the atmosphere) may also be of use. Of course, any such multi-sensor and model-fusion products will require a training module identifying the various components, strengths, and weaknesses.

These data are of immediate relevance to both the initialization and validation of the Navy Aerosol Analysis and Prediction System (NAAPS; a global, multi-component analysis and modeling capability to produce aerosol products from satellite data and surface-based measurements). The goal of NAAPS is to improve the forecasting/nowcasting of visibility restrictions caused by aerosols, including dust, smoke, and volcanic ash. Information and forecast products associated with NAAPS may be found at http://www.nrlmry.navy.mil/aerosol.

Extension to MODIS (Moderate Resolution Imaging Spectroradiometer Processing)

The MODIS instrument offers a similar true color imaging capability together with improved spatial resolution (up to a factor of 4 over SeaWiFS HRPT). FIG. 11 provides an example of the MODIS dust enhancement over the Northern Arabian Sea. Plumes of dust over ocean and dry lakebeds on the desert interior (often serving as sources for dust) are enhanced as shades of pink. Of specific relevance to the dust enhancement product is the availability of thermal infrared channels that enable the discrimination of elevated (cooler) dust plumes over warm backgrounds. See the Appendix for the computer program code listing implementing this technique. On-board calibration of MODIS radiances supports accurate physical retrievals of aerosol optical properties. A technique for producing 250 m true color imagery using 500 m blue/green and 250 m red channels has also been developed. This high spatial resolution capability is enhanced by temporal coverage when considering the Terra (MODIS: 1030 descending node), SeaStar (SeaWiFS: 1200 descending node), and Aqua (MODIS: 1330 ascending node; platform to be launched in April 2002) platforms in concert. This quasi-geostationary 3-hour loop will provide valuable information on cloud and/or dust motion. An enabling document for the MODIS land/ocean significant dust enhancement will be published in the Geophysical Research Letters.

Over-Land Algorithm Applicable to MODIS

Over bright desert backgrounds, dust is exceedingly more difficult to detect than over water. Here, additional information from the infrared is required to separate the dust signal from the other spectrally similar components of the scene. Table 1 lists the MODIS channels used in the current dust enhancement. Radiative transfer model simulations of Rayleigh (molecular) scatter as a function of wavelength and solar/sensor geometry were used to create look-up tables for removal of these limb-brightening contributions from channels 1-4 as noted.

TABLE 1

MODIS Channels Used in Dust Enhancement

| Channel | λ(mm)[a] | Resolution(km) | Description |
|---|---|---|---|
| 1[b] | 0.645 | 0.25 | Red |
| 2[b] | 0.853 | 0.25 | Reflective IR |
| 3[b] | 0.469 | 0.50 | Blue |
| 4[b] | 0.555 | 0.50 | Green |
| 26 | 1.38 | 1.0 | Shortwave Vapor |

TABLE 1-continued

MODIS Channels Used in Dust Enhancement

| Channel | λ(mm)[a] | Resolution(km) | Description |
|---|---|---|---|
| 31 | 11.0 | 1.0 | IR Window 1 |
| 32 | 12.0 | 1.0 | IR Window 2 |

[a]Central wavelength for channel.
[b]Rayleigh scatter removed.

The premise for the over-land enhancement is threefold: i) elevated dust produces a depressed brightness temperature against the hot skin temperature of the land background, ii) this cool layer of dust can be differentiated from water clouds having the same radiometric temperature based on its coloration properties, and iii) mineral dust often produces a positive (and of opposite sign to cirrus) 12-11 μm difference [e.g., Ackerman, 1997].

In formulating this component, the blue and green color guns remain the same as in the over-water algorithm, and the red color gun combines the principles of (i)-(iii) above in the following way:

$$D_{lnd} = L1 + L3 - L4 + (1.0 - L2) \tag{3}$$

scaled over [1.3, 2.7], where non-dimensional terms L1-L4 and associated scalings are specified in Table 2, and $$T_{dyn} = \begin{cases} T_{max}(31) - 21 & \text{if } (T_{max}(31) < 301\ K) \\ (T_{max}(31) - 273)/4 + 273 & \text{otherwise.} \end{cases} \tag{4}$$

All brightness temperatures (T) are given in kelvins and $T_{max}$ is the maximum pixel temperature in the current scene. Typical thermal scaling ranges over Southwest Asia during the summer months are [285, 325 K], but may vary significantly over time, location, and synoptic weather situation. Reflectivities (R) listed in Table 2 are normalized.

TABLE 2

Terms for Over-Land Dust Enhancement

| Term | Expression | Normalization Bounds |
|---|---|---|
| L1 | T(32) − T(31) | −2 → 2 K |
| L2 | T(31) | $T_{dyn}(31)^a \rightarrow T_{max}(31)$ |
| L3 | 2R(1) − R(3) − R(4) − L2 | −1.5 → 0.25 |
| L4 | R(26) > 0.05 ? 0, else 1 | (n/a) |

[a]As supplied in equation 4.

Normalization bounds were determined experimentally based on a wide variety of dust case studies, with values selected toward optimizing dust contrast while maintaining an enhancement appearance consistent with the over-water algorithm. The dynamic temperature scaling (Equation 4) was introduced to reduce seasonal and diurnal effects giving rise to false detection over cold land. Thin cirrus in this formulation produces competing effects—the depressed 12-11 μm difference (L1 term in 3, e.g., Inoue [1985]) is offset by positive contributions from coloration via partial transmittance of land reflectance and sufficiently depressed brightness temperatures (L2 and L3 terms, respectively) to produce false dust enhancements. The 1.38 μm reflectance, situated in a water vapor absorption band, was included as a filter (L4) for cirrus (which reside at levels above most of the tropospheric vapor; see Gao et al. [1998]).

4. Two Examples

Comparisons against standard visible (0.65 μm) imagery scaled to the full dynamic range of the image are presented to illustrate the improved ability of the technique to detect dust. FIG. 12 depicts a heavy dust plume advancing through western Texas in the wake of a springtime frontal passage. Strong westerlies at the surface loft dust from multiple point-sources (revealed in the enhancement as sharply-defined plumes), and the deepening diffuse plume (characteristic of dust in suspension) curls downwind toward the northeast due to backing winds with height associated with post-frontal cold air advection over the region. While the visible imagery gives some indication of the diffuse plume via contrast reduction, the dust signatures are by no means unambiguous and represent only a small subset of the extent of dust in the scene as revealed by the enhancement.

Figure 13:
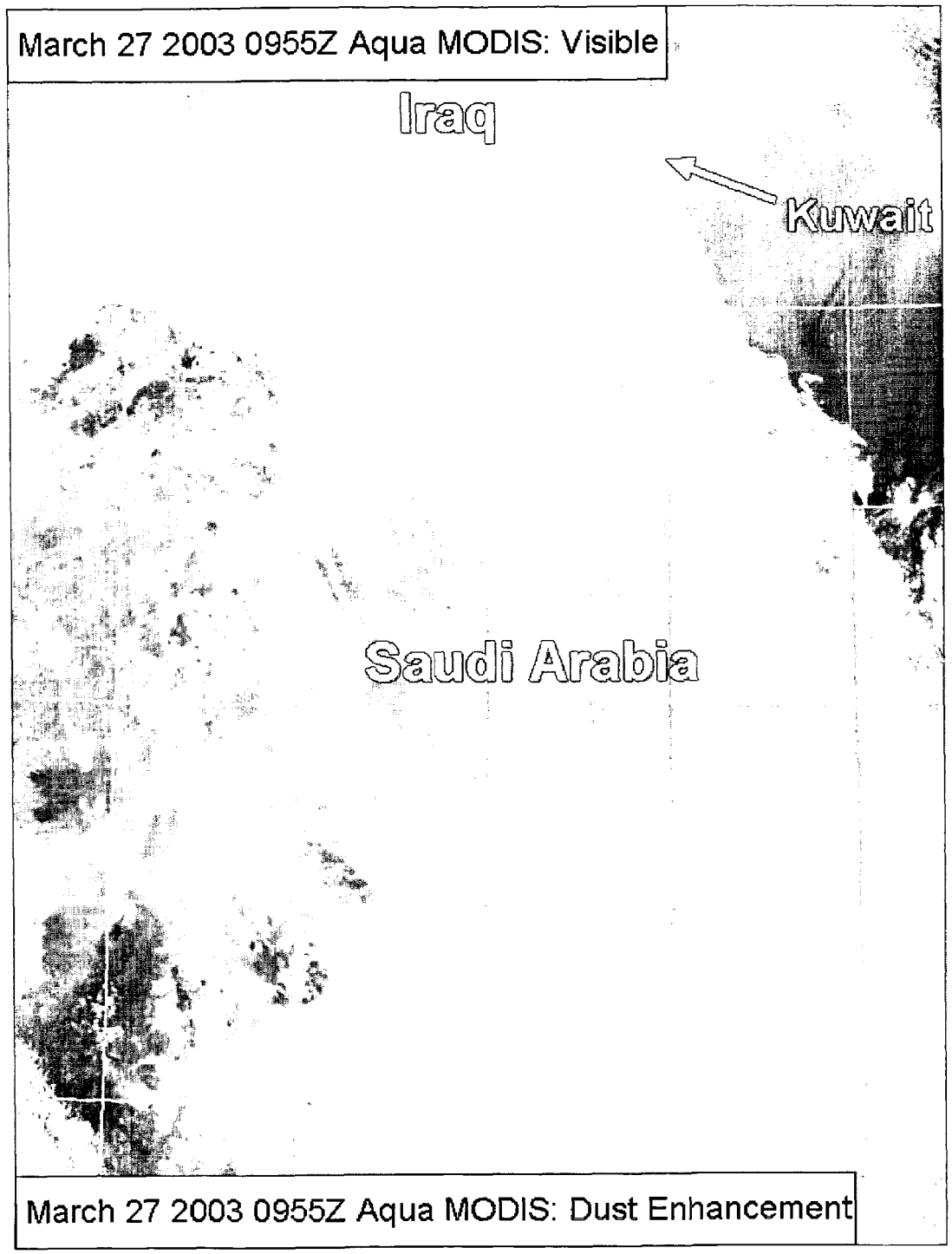
FIG. 13 Dust over Southwest Asia during Operation Iraqi Freedom. Visible channel imagery (top) fails to unambiguously resolve significant details of dust plumes captured by the enhancement (bottom).

In a second example (FIG. 13), collected during the active military phase of OIF, waves of post-frontal dust surge through the Southwest Asia domain. This event was part of a series of major dust impulses associated with the passage of a strong baroclinic system, resulting in a substantial downtime with reduced air support for infantry on the ground in southern Iraq. Improvements to detail and distribution of significant dust areas in comparison to the visible imagery are readily apparent. The dust front crossing Kuwait and entering the Northern Arabian Gulf maintains a similar appearance across the land/sea algorithmic boundary. A field of cumulus clouds on the Iraqi/Saudi border and a band of cirrus over southern Qatar both appear cyan. The lighter cyan of cirrus west of Qatar arises from the over-water algorithm not incorporating the MODIS 1.38 μm channel screen.

Equation 3 follows an "inclusive" approach whereby all scaled and normalized dust-detection components (L1,L2, L3, and L4) have equal opportunity in contributing to the final D_lnd red-gun enhancement term. Whereas this logic aggressively seeks out potential areas of dust in the scene, the cost of this aggression is a high frequency of false alarms (where non-dust regions are enhanced as possible) dust. The most common false alarms involve cold land, cloud shadows, thin cirrus, and sunglint upon unmasked lake bodies. In these cases, one or more of the terms comprising D_lnd are significant. An amendment invoking a new "exclusive" logic scheme has recently been developed, whereby D_lnd is redefined according to:

$$D\_lnd\_new = L1*(1.0-L2)*L3*(1.0-L4), \text{ scaled over } [0.35, 0.75] \quad (5)$$

where the L terms are identical to those defined in Table 2. In the revised logic above, all four components must simultaneously be satisfied for the land pixel in question in order for it to be classified as "dust." The exclusive logic method is by construct far more conservative in what it classifies as dust. The downside to this conservatism is that not all dust regimes produce strong signals in all four L terms (for example, the Split-Window L2 terms decreases in strength for very thick dust), and the compensating effects of other strong terms are limited since now it only takes a single zero-valued term to set the entire D_lnd_new term to zero. The upside to the method is that the false-alarm contributions in the scene are reduced significantly, and regions classified as "dust" have much higher confidence levels. The exclusive definition also allows for more aggressive scaling bounds to D_lnd_new, mitigating in part the problems mentioned above. Performance testing for the new method is ongoing, with only minor corrections to scaling bounds anticipated. The new technique also eliminates the need for topography corrections in handling cold land temperatures . . . which manifested in a "blocky" appearance if applied to the previous scheme.

Figure 14:
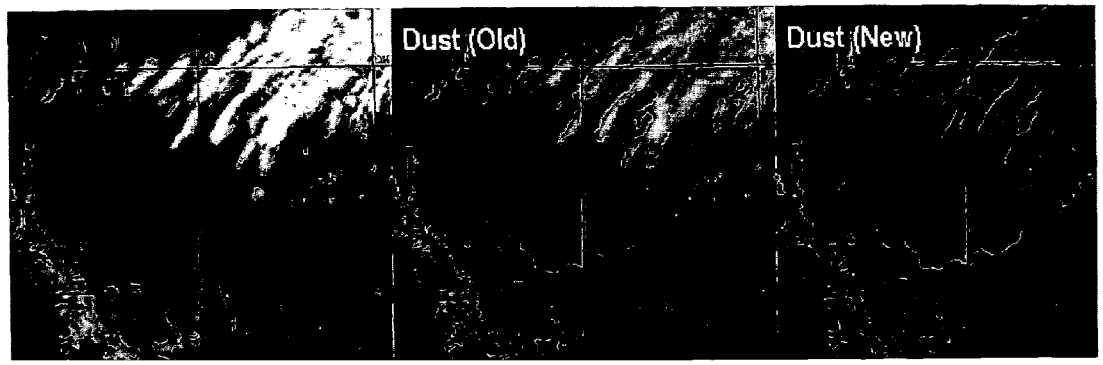
FIG. 14 Demonstration true color (left), original "inclusive logic" dust enhancement (center), and the revised "exclusive logic" dust enhancement (right) for a case study over Nevada.

FIG. 14 illustrates the impact of the new logic as applied to a dust front in Nevada. In the left panel, a true color image reveals the presence of the optically thicker portions of the plume. The dust enhancement following Equation 3 is shown in the center. Here we note that surrounding non-dust regions, particularly in the left portion of the image corresponding to the Sierra Nevada mountain range, assume a reddish appearance owing to cold land contributions. The far-right panel of FIG. 14 demonstrates the result of applying the revised logic (Equation 5) to the same data. Non-dust regions are shown to be less ambiguous, and a stronger contrast between the plume and its surroundings is realized. In spite of the superior performance for this case study, there are other cases where small L1, L2, L3, or L4 terms of D_lnd lead to local suppression of the dust signal, and an inferior enhancement compared to the original (Equation 3) method. As such, Equation 5 should not supplant Equation 3, but rather be considered as a variation of the technique providing superior results in certain dust scenarios.

CONCLUSION

A new method for identifying dust over water and land backgrounds has been developed for applications to multi-spectral satellite imagery. Previous methods are combined with new spectral capabilities available from the MODIS sensors aboard EOS Terra and Aqua to enhance dust as shades of pink while clouds/land appear cyan/green. The method is composed of two algorithms (over land and water) tuned to maintain a similar enhancement of dust crossing coastlines. With minor refinements to digitally mask those areas of enhanced dust (based on thresholds within the three-dimensional color space), the technique would appear to be well-suited as a starting point for overland dust property analyses.

A new processing capability for generation of true color, vegetation enhancement, and over-water dust enhancement imagery from the 8-channel SeaWiFS instrument has also been developed. Near real-time processing of telemetry captured from Navy Regional Centers in Rota, Bahrain, and Yokosuka currently populate the following password-protected website on the NRL Monterey satellite page at 1-2 hour latency:http://kauai.nrlmry.navy.mil/archdat/swf_nrc/

Two main points become clear from the above commentary: 1) SeaWiFS and other sensors offering true color imaging capability are of significant value and in high demand for Navy operations, and 2) in spite of the fact that such data has been available for some time now from the satellite platform (e.g., LandSat-™) this capability has not been transitioned effectively to the end-users who require it (i.e., those deployed in the field). In turn, the twofold intent of this description has been to demonstrate the current in-house processing capabilities for the SeaWiFS sensor and articulate this operational demand. A logical extension to these statements is that there exists a pressing need for X-band receiving stations in perennially sensitive regions of the world for the purpose of capturing MODIS and other high-data-rate (both multi- and hyper-spectral) satellite telemetries. The potential savings in terms of both loss of life and equipment (R. Cantu; "The Role of Weather in Major Naval Aviation Mishaps", MS Thesis, 106 pp., NPS Monterey) which is reported at a 51 million dollars annual loss in Navy equipment attributed to visibility-related meteorological phenomena such as aerosols, dust, and atmospheric trapping layers) owing to improved METOC guidance gained from these state-of-the-art sensors far outweighs the one-time cost of the receiving stations themselves.

Although this invention has been described in relation to an exemplary embodiment thereof, it will be understood by those skilled in the art that still other variations and modifications can be affected in the preferred embodiment without detracting from the scope and spirit of the invention as described in the claims.

The invention claimed is:

1. A system for detecting and enhancing meteorological imagery of dust clouds over land and water, said system comprising:

a collector for storing multispectral optical-spectrum imagery having multiple channels relating to different wavelengths across the visible, shortwave infrared, and thermal infrared portions of the optical spectrum; and a processor coupled to said collector, said processor operable to receives the multispectral optical-spectrum imagery and processes the digital data by, performing a numerical atmosnheric correction for removal of molecular scatter within all of the visible-spectrum channels, based on radiative transfer calculations stored in pre-computed look-up tables and indexed as a function of solar and sensor geometry, determining the pixel background for each pixel of the multispectral optical-spectrum image by combining known earth location with a terrestrial database, employing a background-dependent algorithm to compute the dust enhancement parameter $\Delta$, displaying the multispectral optical-spectrum imagery coupled to the processor, said displaying the multispectral optical-spectrum imagery comprises a red, blue and green color for displaying the visible light spectrum via a hue/saturation decomposed color technique, creating a false color composite, wherein said false color composite is created by loading the background-dependent D variable into a red color gun, loading log-scaled percent-reflectance into blue and green color guns of said false color composite, and the resultant imagery rendered depicts atmospheric dust as visually enhanced in red/pink tonalities.

2. The system of claim 1, wherein a pixel is determined to have a land background.

* * * * *